INVENTOR
DONALD D. DeFORD &
JAMES N. PITTS, JR.

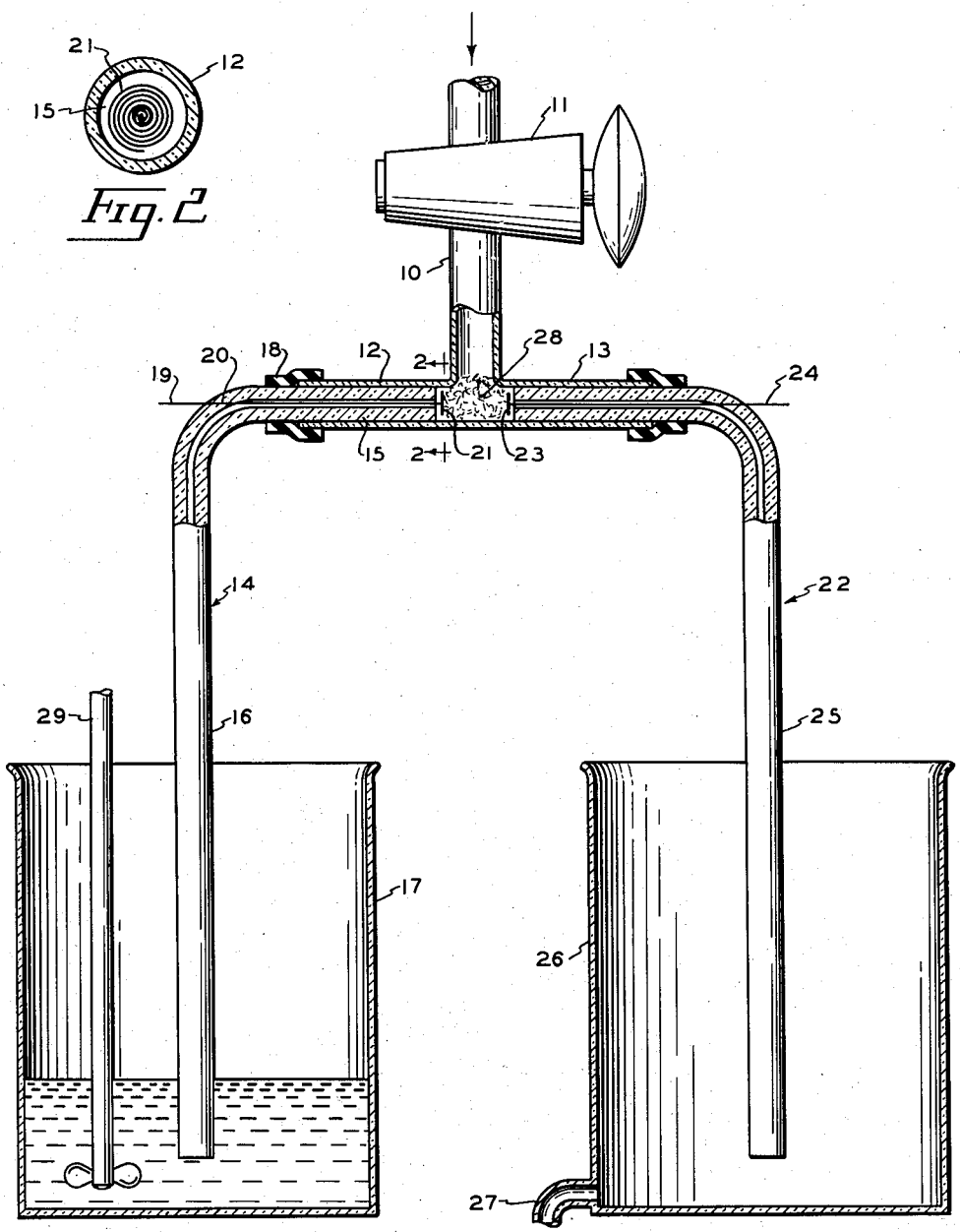

BY Stowell & Evans

ATTORNEYS

UNITED STATES PATENT OFFICE 2,744,061
Patented May 1, 1956

2,744,061

COULOMETRIC TITRATION

Donald D. De Ford, Glenview, and James N. Pitts, Jr., Evanston, Ill., assignors to Research Corporation, New York, N. Y., a corporation of New York Application April 16, 1951, Serial No. 221,248

3 Claims. (Cl. 204—1)

This invention relates to coulometric titration and more particularly to apparatus and a method for performing indirect coulometric titrations, i. e. titrations wherein the titration reaction occurs in a vessel separate from an electrolytic cell in which the titrating reagent is formed. Indirect coulometric titration is distinguished from direct coulometric titration; in the latter the titrating reagent is generated in the same cell in which the titration reaction takes place.

Objects of the invention are to provide apparatus and a method for titrating unknown samples with an electrolytically prepared reagent generated externally of the titration vessel wherein the need for standard reagent solutions is eliminated, automatic control of the titration is facilitated, a wide range of sample size is permitted, and very accurate and versatile titrations are made possible with a minimum expenditure of time on the part of an operator. In the indirect coulometric titration method of the invention, the generator electrodes are not in contact with the sample solution and there are no undesired side reactions of any of the constituents of the sample. Optimum conditions both for electrolytic generation of the reagent and for titration of the sample therewith can be achieved. No complex combined generation and titration vessel is required. In accordance with the invention, various convenient means for determining end points may be utilized. Standard reagent solutions may be readily prepared by the method of the invention.

For the achievement of the foregoing aims, objects and advantages, there is provided apparatus for performing indirect coulometric titrations including means providing an electrolysis chamber, spaced anode and cathode elements in the chamber, reagent solution inlet means for the chamber, a catholyte outlet conduit communicating with the chamber adjacent the cathode element, an anolyte outlet conduit communicating with the chamber adjacent the anode element, means controlling the flow of electrolyte through the chamber, and means for energizing the electrode elements.

Although the apparatus of the invention can be manually operated, it has been found desirable and practical to provide for automatic operation and control thereof as will be pointed out more particularly hereinafter.

The method of the invention includes electrolysing a reagent solution, separating the anolyte component from the catholyte component, reacting one of the electrolyte components with an unknown solution, determining the end point of the reaction, and measuring the quantity of electricity required to provide the amount of the one electrolyte component utilized in the reaction. From the determination of the quantity of electricity required, it is matter of simple calculation to arrive at the value or analysis of the unknown solution.

It has been found convenient and desirable to determine the quantity of electricity by measurement of the time during which a uniform known current flows through the reagent generating cell and to calculate the quantity of electricity from these parameters.

The invention will be described with greater particularity and other of its aims, objects and advantages will be in part apparent and in part pointed out in the following detailed description of the exemplary embodiments shown in the drawings, wherein:

Fig. 1 is a vertical elevational view of one form of apparatus in accordance with the invention;

Fig. 2 is a sectional view taken along the line 2—2 of Fig. 1; and

Figure 3:
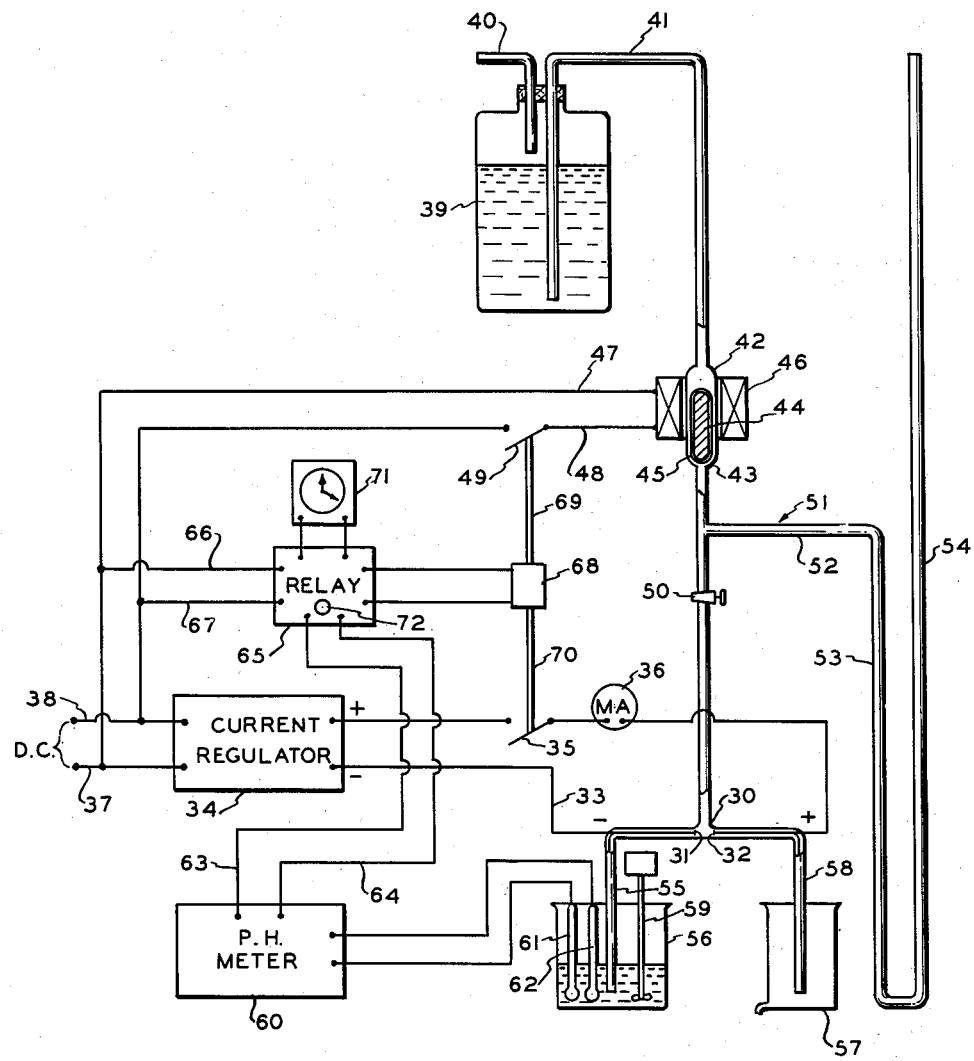
Fig. 3 is a somewhat diagrammatic view of an automatic system for performing indirect coulometric titrations.

Referring to the drawings, particularly to Figs. 1 and 2 thereof, the titration apparatus shown has a T-shaped glass fitting including a riser 10 provided with a stopcock 11. Reagent solution flows into the apparatus in the direction of the vertical arrow of Fig. 1 from a conventional reservoir (not shown). The T-shaped fitting has a pair of laterally extending arms 12 and 13. An L-shaped capillary tube 14 of glass or the like has its short horizontal leg 15 received in the bore of the arm 12, the end of the leg 15 terminating just short of the point of intersection of the riser 10. The longer leg 16 of the capillary tube depends into a titration vessel or beaker 17. A rubber sleeve 18 seals the joint between the tube 14 and the arm 12. A platinum lead-in wire 19 projects through the wall of the capillary tube 14 and is sealed therein at 20. The lead-in wire extends through the bore of the short leg 15 of the tube and terminates at the end of the leg in a spirally wound electrode member 21 seen in side elevation in Fig. 2.

A similar capillary tube 22 is fitted in the bore of arm 13. It has an electrode 23 and lead-in wire 24 similar to the corresponding parts associated with the tube 14. The longer leg 25 of the capillary tube 22 depends into a vessel 26 having a drain conduit 27. A loosely packed plug 28 of glass wool or the like may be inserted in the T-shaped fitting between the electrodes 21 and 23.

The beaker 17 may be provided with a mechanical agitator 29, if desired.

Use of the apparatus of the apparatus of Figs. 1 and 2 will be described with reference to acid-base titrations. An aqueous solution of sodium sulfate approximately 1.0 M is passed into the electrolysis cell through the riser 10. At the T joint the solution divides into two approximately equal streams flowing out through the delivery tips 14 and 22. An electrolysis current of about 250 ma. is passed through the electrolytic cell, the electrode 21 being made the cathode and the electrode 23 the anode. A D. C. potential of from 6 to 15 volts across the cell is required. Any suitable manually controlled source of direct current is employed for energizing the electrodes and an accurate ammeter is used to measure current and to maintain the current constant.

The stop-cock 11 is adjusted so that about 0.1 ml. per second of liquid flows from each of the delivery tips. With the current flowing through the cell, the cathode reaction is:

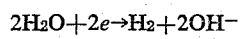

and the anode reaction is:

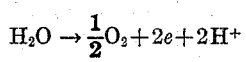

Base is thus delivered from the cathode delivery tip 14 and acid is delivered from the anode tip 22.

The current and liquid flow are adjusted to the desired constant values and an unknown batch sample of acid in beaker 17 is placed under the delivery tip 16. The sample contains a color end point indicator such as bromcresol green-methyl red mixed indicator. A stop-watch is started when titration begins. At the end point of the reaction, the watch is stopped. The gram milliequivalents of acid in the unknown sample are calculated from the following equation:

$$\text{m. eq.} = \frac{I \times t}{96.5}$$

in which I is the average current flowing through the cell measured in amperes, $t$ is the time in seconds required for the titration and the number 96.5 is a constant.

Using the same apparatus, reagent and technique, titration of unknown samples of base are made with the anolyte issuing from the anode delivery tip 22.

The portion of the generator cell between the electrodes 21 and 21 is packed with glass wool in order to prevent mechanical mixing of the catholyte and anolyte. This simple precaution insures that the products of electrolysis at each of the electrodes are quickly and quantitatively forced into the respective delivery arms. The spirally wound platinum wire electrodes provide large surfaces for reaction as the solution passes through the turns of the spiral.

The apparatus and process of the invention are also adapted to other types of titration. Iodine can be generated in the anolyte from a solution of potassium iodide and with such anolyte iodimetric titrations can be performed. Still other electrolytically generated reagents may be made including $Br_2$, $Cl_2$, $Cu^+$ and $Fe^{+2}$.

Referring to Fig. 3, there is shown diagrammatically an automatic titration system employing the principles discussed hereinbefore. The electrolysis cell, shown at 30, has a cathode 31 and an anode 32. The cathode is connected by a wire 33 to the negative output terminal of an automatic current regulating device 34 of which various types are available. This current regulator assures that a constant current will pass through the electrolysis cell notwithstanding variations in cell resistance. The positive output terminal of the direct current regulating device 34 is connected to the anode 32 through a switch 35 and a milliammeter 36. Direct current is supplied to the current regulator from the line 37, 38.

Reagent solution is stored in a bottle 39 having a vent tube 40 and a syphon tube 41 that delivers solution to the cell. In the syphon tube is a solenoid actuated valve including a bulb 42 having a bottom portion 43 forming a valve seat. The valve includes a plug having a core 44 of a magnetic metal encased in a glass envelope 45 for protection of the core against corrosion. A coil 46 surrounds the bulb 42 and is connected by wires 47 and 48 to the line 37, 38 through a switch 49. When the coil 46 is deenergized, the plug 44 is seated in the bottom 43 of the bulb 42 and the valve is closed. When the coil is energized, the plug is raised from the valve seat and the valve is open.

The tube 41 has a stop-cock 50 by means of which the rate of flow of solution through the electrolysis cell is regulated. A side tube 51 communicates with the reagent feed tube 41 between the solenoid valve and the stopcock. This tube has a horizontal portion 52, a U-shaped section having a depending portion 53 and a rising portion 54 open at the top. At the start of a titration when the solenoid valve is opened, the side tube 51 fills with reagent solution and, when the solenoid valve is closed at the end of a titration, the side tube empties in part through the electrolysis cell to flush the latter thus insuring that all electrolysed reagent is washed from the cell into the titration vessel.

Catholyte from the electrolysis cell issues from the cathode delivery leg 55 into a titration vessel 56 and anolyte passes to a receiver 57 through the anode delivery leg 58. The titration vessel may be equipped with an agitator 59.

The end point of the titration may be sensed electrically by means of a conventional pH meter 60 having the usual calomel electrode 61 and glass electrode 62 immersed in the sample in the titration vessel.

The pH meter is connected through wires 63 and 64 to a relay 65 that is energized from the line 37, 38 through conductors 66 and 67. The relay energizes and deenergizes a solenoid coil 68 that operates through rods 69 and 70 to close the switches 49 and 35 when the coil is energized; upon deenergization of the coil, the switches fall open. The relay device also serves to start a clock 71 at the moment the switches 49 and 35 are closed and to stop the clock when the switches are open. A starting button 72 is provided for manually actuating the relay device to close the switches 49 and 35 and to start the clock 71.

Operation of the apparatus of Fig. 3 will be described with reference to the titration of an unknown acid sample using sodium sulfate reagent. With the reagent in the bottle 39, the stop-cock 50 is adjusted to give the desired rate of flow of reagent through the electrolysis cell 30. The latter functions in the manner described hereinbefore in connection with Figs. 1 and 2 to deliver a basic titrating solution from the delivery tip 55 and an acid solution from the delivery tip 58.

A beaker containing an unknown acid solution is placed under the cathode delivery tube 55 and the starting button 72 is actuated to start the clock 71 and to close the switches 49 and 35. Thus, the solenoid valve 44 is opened and reagent flows through the electrolysis cell. Also, a uniform electric current of selected amperage flows through the electrolysis cell to generate the titrating reagent that is delivered into the unknown sample in the beaker 56.

The pH meter 60 is adjusted to deliver an actuating impulse to the relay 65 at the end point of the titration reaction as sensed by the electrodes 61 and 62. When the end point is reached, the relay is actuated by the pH meter to stop the clock 71 and to open the switches 49 and 35 thereby closing the solenoid valve 44 and opening the circuit through the electrolysis cell 30. The electrolysis cell 30 is flushed, as described hereinbefore, by the stand of reagent in the side tube 51 and the titration is completed.

From the electrolysis current as noted on the milliammeter 36 and the time as registered by the clock 71, the acidity of the unknown sample is calculated in milliequivalents by multiplying current (amps.) by time (secs.) and dividing by the constant 96.5.

The apparatus is immediately ready for another titration cycle.

From the foregoing description, a number of obvious changes and modifications will readily occur to those skilled in the art to which this invention pertains without departing from the spirit and scope of the invention as defined in the following claims.

We claim:

1. An indirect coulometric titration method which comprises forming two streams of a reagent solution from a common source, passing a direct current through said reagent solution between separate electrodes positioned in said two streams on opposite sides of said common source to continuously form an anolyte component in one of said streams and a catholyte component in the other of said streams, passing one of said streams into an unknown batch solution so that chemical reaction occurs between an electrolyte component of the stream and an ingredient of said unknown solution, determining the end point of said reaction and determining the total quantity of electricity used to generate the electrolyte component consumed in said reaction.

2. Apparatus for performing indirect coulometric titrations which comprises means providing an elongated electrolytic chamber, a pair of electrolyte outlets positioned at opposite ends of said chamber and a reagent solution inlet into said chamber positioned intermediate the outlets of said pair of outlets, an anode in said chamber near one of the outlets of said pair of outlets, a cathode in said chamber near the other of the outlets of said pair of outlets, one of said outlets provided with a discharge conduit, a vessel positioned to receive discharged electrolysed reagent from the discharge conduit, means in said vessel for sensing the end point of a tritration reaction, means supplying direct current to the anode and cathode, valve means in a reagent solution supply conduit attached to said reagent solution inlet, and means operatively connected to said end point sensing means for interrupting the supply of direct current to said anode and said cathode and for closing said valve means in response to an end point signal of said sensing means.

3. Apparatus as defined in claim 2 including a clock and means operatively connecting said clock to said end point sensing means to stop said clock in response to the end point signal of said sensing means.

References Cited in the file of this patent

UNITED STATES PATENTS

| | | |
|---|---|---|
| 1,195,617 | Slater | Aug. 22, 1916 |
| 2,354,553 | Sherk | July 25, 1944 |
| 2,566,308 | Brewer | Sept. 4, 1951 |
| 2,621,671 | Eckfeldt | Dec. 16, 1952 |

FOREIGN PATENTS

| | | |
|---|---|---|
| 692,099 | Germany | June 12, 1940 |

OTHER REFERENCES

"Chemical Abstracts," vol. 32 (1938), pages 5325 and 6179; abstracts of publication by Szebelledy et al.

"Analytical Chemistry," vol. 19, No. 9 (September 1947), pages 675–677, article by Epstein et al.

"Proc. National Academy of Sciences," vol. 36 (1950), pages 612 and 613, article by De Ford et al.